C. J. TROPPMAN.
BINOCULAR MAGNIFIER.
APPLICATION FILED FEB. 17, 1912.

1,033,965.

Patented July 30, 1912.

Witnesses:

Inventor
Chas. J. Troppman.
By Benj. T. Roodhouse
Atty

UNITED STATES PATENT OFFICE.

CHARLES J. TROPPMAN, OF CHICAGO, ILLINOIS, ASSIGNOR TO F. A. HARDY & COMPANY, A CORPORATION OF ILLINOIS.

BINOCULAR MAGNIFIER.

1,033,965.

Specification of Letters Patent.   Patented July 30, 1912.

Application filed February 17, 1912. Serial No. 678,328.

*To all whom it may concern:*

Be it known that I, CHARLES J. TROPPMAN, a citizen of the United States, and a resident of the city of Chicago, Cook county, State of Illinois, have invented a new and useful Binocular Magnifier, of which the following is a specification.

My invention relates to the provision of a binocular magnifier which shall be suitable, for that class of artisans and scientists who require an instrument of the best quality; and the objects of my invention are, first, to provide an instrument which shall be light, and, at the same time, will have sufficient rigidity to maintain the lenses surely and securely in their proper relations; second, in such an instrument to provide means for the necessary adjustments without sacrificing stability; third, to provide in such an instrument a single adjustment which will take care of the distance between the lenses and the change of angle of the lenses to the eye of the wearer; and, fourth, the provision in such an article of a tube which will exclude extraneous light, protect the eyes from flying particles, and at the same time will permit the wearer to look down upon the table or bench for the purpose of getting a tool or otherwise without the necessity of taking the instrument off or of looking through the magnifiers.

Figure 1:
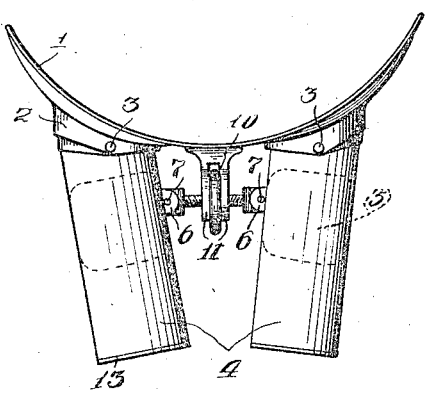
Figure 2:
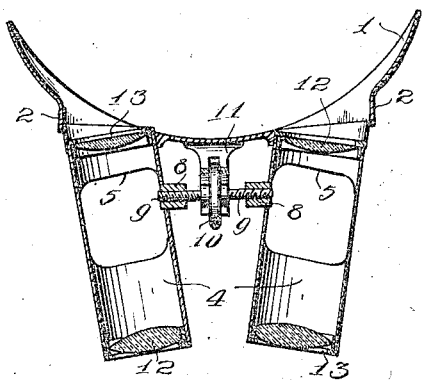
Figure 3:
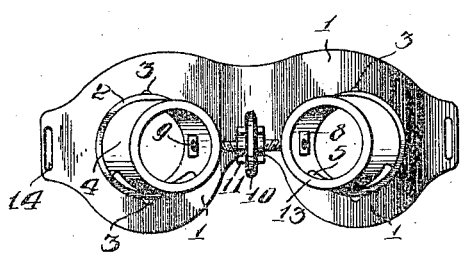
Figure 4:
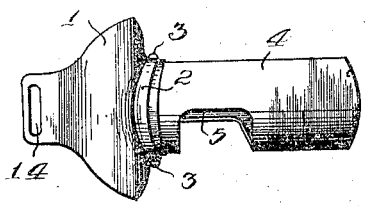
Figure 5:
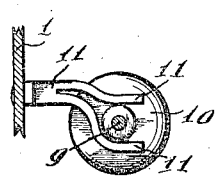

I attain the above objects by means of the structure illustrated in the accompanying drawing, in which:—Figure 1 is a plan of my magnifiers; Fig. 2 is a horizontal central section; Fig. 3 is a front elevation; Fig. 4 is a side elevation, and—Fig. 5 is a fragmental detail of the central bracket, knurled disk, and right and left screw for adjusting the tubes.

Similar reference characters refer to similar parts throughout the several views.

The reference numeral 1 designates a face plate which is shaped, to conform to and fit upon the face about the eyes. The face plate has eye apertures therein, and is formed with forwardly extending flanges, 2, about said apertures. Pivots or pintles, 3, are provided in the tops and bottoms of the flanges, 2, upon which swing laterally forwardly extending tubes 4, in the lower walls of which are sight openings, 5, through which the table or bench may be seen without looking through the magnifiers. Upon opposite portions of the tubes, 4, are centrally extending brackets, 6, to which are pivoted by pivots, 7, blocks, 8, which are bored and threaded to receive the opposite ends of the right and left screw rod, 9, upon the center of which is mounted a disk, 10, with a knurled edge for convenience in turning.

Secured to the central portion of the face plate, 1, is a bracket, 11, having four arms which extend so as to come above and below the screw rod, 9, upon either side of the disk, 10, so as to locate the rod and permit the forward and back motion thereof developed by rotating it. Lenses, 12, may be mounted by cement, or in any other suitable manner in lens cells, 13, which slide into the front and rear ends of the tubes, 4, and are maintained there by friction.

It is a convenient arrangement to have the forward lenses, which are the magnifiers decentered, as shown in Fig. 2, so as to render the rays entering the eye parallel and fulfil the conditions necessary for easy binocular vision. The rear lenses may conveniently be utilized for supplying the correction, if any, necessary for the particular user, but, as is obvious, any desired arrangement or combination may be mounted as described in the tubes, 4, and when so mounted will be firmly maintained there.

It is further obvious that for each adjustment of the magnifiers together or apart the angle thereof will be changed so as to continue them at right angles to the optical axis, a feature which is believed to be new in binocular magnifiers.

Slots, 14, are provided in each end of the face plate, 1, to which may be secured any desired means for maintaining the magnifiers in position upon the face.

From the foregoing description, taken in connection with the drawings, it will be seen that the structure, while simple, will afford a substantiality and rigidity necessary for an accurately working optical instrument, it will also afford facilities for accurately obtaining the desirable adjustments; it will have a high degree of efficiency in that extraneous light will be largely eliminated it will afford the operator a limited but extremely useful range of vision without looking through the magnifiers and without removing the instrument; and it will constitute an efficient protection to the eyes from flying particles.

Having described my invention, what I claim as new, and desire to secure by Letters Patent is:—

1. A binocular magnifier comprising a face plate formed to conform to and fit the face about the eyes, said plate having eye openings therein and flanges extending outwardly from the edges of said eye openings, tubes the ends whereof are pivoted in said flanges, blocks pivoted upon the adjacent sides of said tubes, said blocks being bored and threaded, a right and left screw working in the threads of said blocks, a disk mounted centrally of said screw, a bracket extending from said face plate about said screw and disk, and lens cells frictionally assembled in said tubes.

2. A binocular magnifier comprising a face plate, said face plate having eye openings, tubes pivoted in said eye openings, sight openings in the lower walls of said tubes adjacent said face plate, means for adjusting the outer ends of said tubes at different distances from each other, and lens cells mounted in the ends of said tubes.

3. A binocular magnifier comprising a member adapted to conform to and fit upon the face, lens holding members pivoted thereto, blocks pivoted to adjacent portions of said lens holding members, said blocks being bored and threaded, a right and left screw working in the threaded blocks, a disk centrally disposed upon said screw, and a bracket surrounding said disk and screw for centrally locating the same.

4. A binocular magnifier comprising a frame to fit the face, lens holding members pivoted thereto, and means for converging said lens holding members toward their outer ends and swinging the lenses so that the lenses will be constantly at the same angle to the optical axis of the lenses.

In testimony whereof I have hereunto set my hand in the presence of two witnesses.

CHARLES J. TROPPMAN.

Witnesses:
EDWARD S. CRAVEN,
EDWARD E. SWADEUER.